Oct. 21, 1958          E. W. SPANNHAKE          2,857,169
                      VARIABLE TREAD VEHICLE
Filed July 20, 1955                        2 Sheets-Sheet 1

INVENTOR.
ERNST W. SPANNHAKE
BY John F. Schmidt

ATTORNEY

Oct. 21, 1958     E. W. SPANNHAKE     2,857,169
VARIABLE TREAD VEHICLE

Filed July 20, 1955     2 Sheets-Sheet 2

*INVENTOR.*
ERNST W. SPANNHAKE
BY John F. Schmidt

ATTORNEY

United States Patent Office 2,857,169
Patented Oct. 21, 1958

2,857,169

VARIABLE TREAD VEHICLE

Ernst W. Spannhake, Peoria, Ill., assignor to LeTourneau-Westinghouse Company, Peoria, Ill., a corporation of Illinois Application July 20, 1955, Serial No. 523,172

1 Claim. (Cl. 280—80)

This invention relates to a variable tread vehicle, and in the embodiment shown is applied to logging arches, of the general type shown in Patents 2,058,473 and 2,572,636, to R. G. LeTourneau.

There are many vehicles in use today which are designed primarily for off-the-highway operation where no load or size limitations are imposed. However, it often becomes desirable to move such vehicles from one job to another under their own power over a public highway. In such a case for a vehicle that is wider than a specified standard maximum, special permission must be obtained to operate the vehicle on a public highway. It is therefore desirable to construct such a vehicle in such a manner as to fulfill the requirements of off-highway operation but which is nevertheless convertible to a vehicle of standard width so that it can be operated on the highway without obtaining special permission.

It is accordingly an object of this invention to provide a vehicle having a variable width by providing one having a variable tread, the structure being such as to permit operation of the vehicle off the highway with the wheels outside the framework, the structure further permitting ready movement of the wheels to a position inside the framework, whereupon the maximum width of the vehicle is the width of the frame. This and other objects are accomplished in a vehicle having its ground contact wheels mounted on walking beams, the walking beams being pivotable in to either one of two operating positions, namely an "outside" position for off-the-highway operation, the other being an "inside" position for highway operation.

Figure 1:
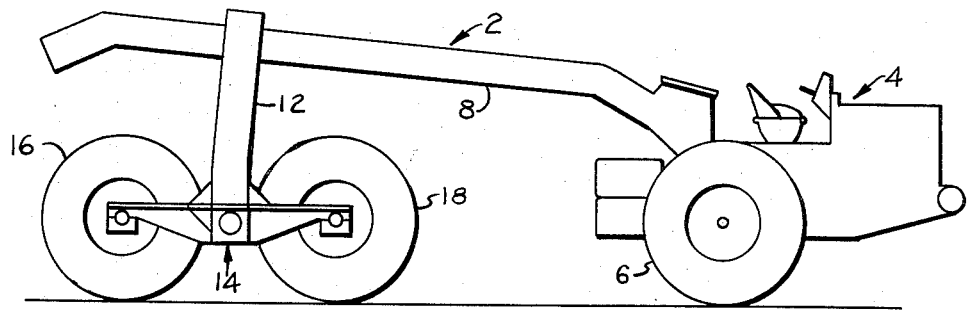
Fig. 1 is a side elevation view of a vehicle made according to the invention.

In the embodiment shown in the drawings, a trailing unit indicated generally at 2 is shown connected with a tractor indicated generally at 4. Tractor 4 may be any suitable conventional prime mover, and is here shown as a two-wheel tractor having a pair of drive wheels, one of which is shown at 6.

In the embodiment shown, the trailing unit includes a top beam 8 to which is secured a pair of opposed legs 10 and 12, the legs being disposed in a generally upright position.

The trailing unit is shown equipped with supporting wheels, the wheels being preferably mounted on walking beams. Each leg has associated therewith a walking beam in the vicinity of its lower end. Thus, leg 12 is shown as provided with a walking beam indicated generally at 14, and walking beam 14 carries a pair of wheels 16 and 18 arranged in tandem and being disposed in substantially the same plane.

Figure 2:
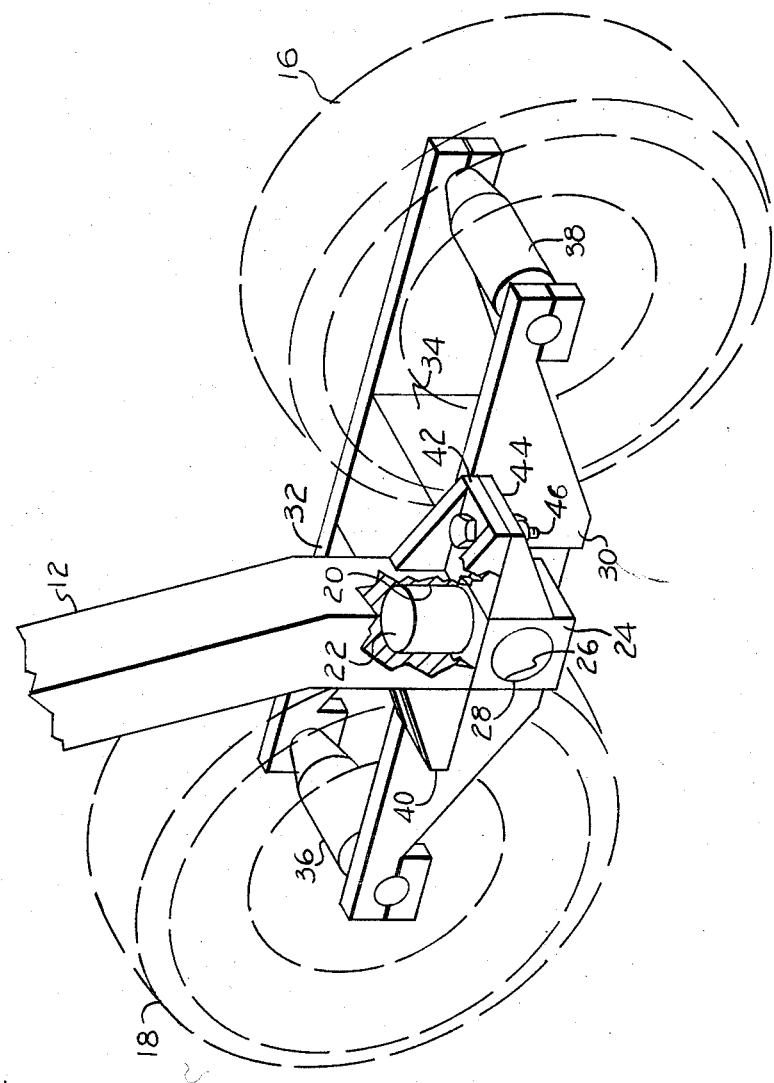
Fig. 2 is a view in perspective and partly in phantom of a portion of the vehicle shown in Fig. 1, Fig. 2 being on a much larger scale than Fig. 1.

Referring to Fig. 2 for greater detail, leg 12 is shown as being provided with one portion of a pivot-forming means at its lower end, the portion referred to comprising a socket 20 in the lower end of leg 12, socket 20 being adapted to cooperate with another portion of a pivot-forming means secured to the walking beam.

More specifically, the second pivot-forming means consists of a pin 22 having a substantially vertical axis and being received by socket 20 for cooperation therewith to provide means whereby wheels 16 and 18 may be pivotable relative to leg 12. Pin 22 is carried on a member 24 which provides a socket 26 in which walking beam axle 28 is received. Axle 28 is secured to one of a pair of spaced members 30 and 32, members 30 and 32 being spaced apart by a suitable spacer member 34. Spaced members 30 and 32 carry wheel axles 36 and 38 on which are mounted wheels 18 and 16 respectively in any suitable conventional manner.

From the foregoing, it will be seen that the invention embodies two pivot-forming portions for each leg and walking beam assembly; one of these pivot-forming portions is associated with the leg and the other is associated with the walking beam. In order to hold the walking beam against pivoting about the substantially vertical axis defined by pin 22, latch means are provided. In the embodiment shown, the latch means comprise a pair of projections on one portion of the pivot forming means and a single cooperating projection on the other portion of the pivot-forming means.

More specifically, leg 12 is provided at its lower end with a pair of projections 40 and 42, and the other portion of the pivot-forming means carries a single projection 44. The projections are provided with suitably alignable openings to receive means designed to prevent relative movement; as here shown, a bolt 46 is adapted to engage the openings when they are properly aligned to hold the walking beam against pivoting.

Operation

Figure 3:
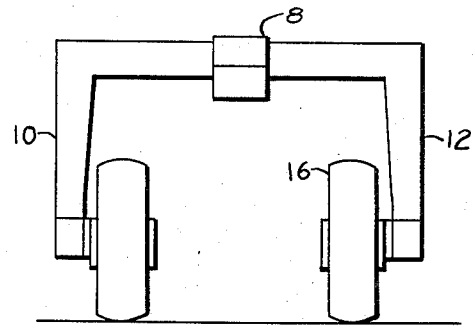
Fig. 3 is a rear end elevation view of the vehicle of Fig. 1 and showing the wheels occupying their "inside" position.

Let it be assumed that the vehicle starts out with the wheels shown in the "inside" position, this being the position indicated in Figs. 1–3. With the wheels in this position, the vehicle is narrow enough for routine operation on the public highways; see especially Fig. 3. In this condition, the vehicle is moved to the site of an off-highway operation, and when it arrives at the location of the next job, the operator unscrews the nut from bolt 46, removes the bolt, swings the walking beam 180° about the axis of pin 22 and aligns the opening in projection 44 with the opening in projection 40. He then puts bolt 46 through the aligned opening and replaces the nut. He performs this operation on both legs 10 and 12, after which the vehicle looks as seen in Fig. 4, in which condition it is ready for whatever operation is contemplated.

Figure 4:
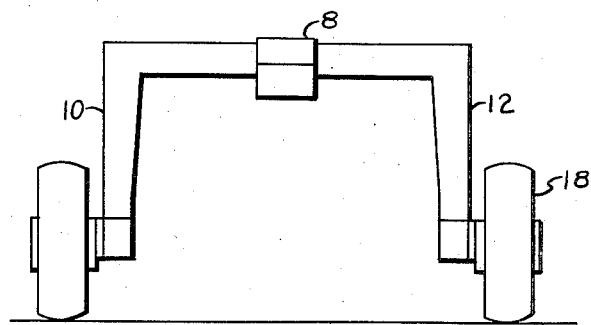
Fig. 4 is an end elevation view similar to Fig. 3 but showing the vehicle wheels in their "outside" position.

With the wheels in the "outside" position shown in Fig. 4, the full width of the arch between legs 10 and 12 is available for operation of the vehicle. When the vehicle has finished in the new location and is ready for movement to another job over a public highway, bolt 46 is again removed, and the walking beam for each leg is again pivoted through 180° to align the openings in projections 42 and 44. The bolt is again secured in place, and when this operation has been completed for both legs 10 and 12, the vehicle is once more ready for movement on a public highway.

It will be apparent to those skilled in the art from the foregoing description and the accompanying drawings that this invention provides a walking beam type of vehicle having a variable tread to provide a variable road width, and that this is done in a device which is simple and inexpensive to manufacture. Other advantages will be apparent to those skilled in the art.

What is claimed is:

A variable tread vehicle comprising a pair of legs disposed in a generally upright position, means comprising one portion of a pivot-forming means and having a substantially vertical axis at the lower end of each leg, a walking beam for each leg and having a pair of spaced members, a pair of substantially coplanar wheels rotatably mounted between the spaced members, means on the spaced members to form another portion of said pivot-forming means and cooperably connected with the first-named portion whereby the walking beam is pivotable relative to its associated leg, the second-named portion being offset relative to the plane of the wheels, a pair of projections on one portion of the pivot-forming means, and means on the other portion of the pivot-forming means to engage a selected one of said projections to hold the walking beam against pivoting.

References Cited in the file of this patent

UNITED STATES PATENTS

| | | |
|---|---|---|
| 1,560,802 | Julstedt | Nov. 10, 1925 |
| 2,124,149 | Redhead | July 19, 1938 |
| 2,218,510 | Albertson | Oct. 22, 1940 |
| 2,351,830 | Mitchell | June 20, 1944 |
| 2,572,636 | LeTourneau | Oct. 23, 1951 |
| 2,573,040 | May | Oct. 30, 1951 |
| 2,581,533 | Hipple | Jan. 8, 1952 |